US010505598B2

(12) United States Patent
    Pi

(10) Patent No.: US 10,505,598 B2
(45) Date of Patent: Dec. 10, 2019

(54) METHODS AND APPARATUS FOR FIXED BROADBAND COMMUNICATION AND BACKHAUL ACCESS WITH LARGE NUMBER OF ANTENNAS

(71) Applicant: Verizon Patent and Licensing Inc., Basking Ridge, NJ (US)

(72) Inventor: Zhouyue Pi, Allen, TX (US)

(73) Assignee: Verizon Patent and Licensing, Inc., Basking Ridge, NJ (US)

(*) Notice: Subject to any disclaimer, the term of this patent is extended or adjusted under 35 U.S.C. 154(b) by 0 days.

(21) Appl. No.: 16/295,164

(22) Filed: Mar. 7, 2019

(65) Prior Publication Data
    US 2019/0207658 A1    Jul. 4, 2019

Related U.S. Application Data

(63) Continuation of application No. 15/908,128, filed on Feb. 28, 2018, now Pat. No. 10,298,298, which is a continuation of application No. 15/683,452, filed on Aug. 22, 2017, now abandoned.

(60) Provisional application No. 62/377,941, filed on Aug. 22, 2016.

(51) Int. Cl.
    *H04B 7/04*     (2017.01)
    *H04B 7/0417*   (2017.01)
    *H04B 7/06*     (2006.01)
    *H04W 88/02*    (2009.01)
    *H04B 7/0452*   (2017.01)
    *H04B 7/10*     (2017.01)

(52) U.S. Cl.
    CPC ......... *H04B 7/0421* (2013.01); *H04B 7/0695* (2013.01); *H04B 7/0452* (2013.01); *H04B 7/10* (2013.01); *H04W 88/02* (2013.01)

(58) Field of Classification Search
    CPC .................... H04B 7/0421; H04B 7/0695
    See application file for complete search history.

(56) References Cited

U.S. PATENT DOCUMENTS

| 2008/0285670 | A1  | 11/2008 | Walton et al. |             |
|--------------|-----|---------|---------------|-------------|
| 2009/0160707 | A1* | 6/2009  | Lakkis ................. | H04B 7/0417 342/367 |
| 2014/0098912 | A1* | 4/2014  | Yin ...................... | H04B 7/0417 375/345 |

(Continued)

OTHER PUBLICATIONS

Pi, et al., "Millimeter-wave gigabit broadband evolution toward 5G: fixed access and backhaul", in IEEE Communications Magazine, vol. 54, No. 4, pp. 138-144, Apr. 2016.

*Primary Examiner* — Kabir A Timory

(57) ABSTRACT

A consumer premise equipment (CPE) which may comprise a processor, a storage medium, and an antenna, wherein the processor may be operatively coupled to the storage medium and the antenna to receive, from multiple antennas of a hub station, a first beam training announcement signal that may inform the CPE to be ready to receive a beam training packet using one or more beams, wherein the beam training packet may include a plurality of symbols that are each beamformed using a different beamformer or precoder; and send, to the hub station, a beamforming feedback report based on measurements taken by the CPE, possibly as a result of the CPE receiving the first beam training announcement signal.

20 Claims, 10 Drawing Sheets

(56) References Cited

U.S. PATENT DOCUMENTS

2014/0206406 A1    7/2014   Cordeiro et al.
2017/0078004 A1    3/2017   Capar et al.

* cited by examiner

METHODS AND APPARATUS FOR FIXED BROADBAND COMMUNICATION AND BACKHAUL ACCESS WITH LARGE NUMBER OF ANTENNAS

CROSS REFERENCE TO RELATED APPLICATION

This application is a continuation of U.S. patent application Ser. No. 15/908,128, filed on Feb. 28, 2018, which in turn is a continuation of U.S. patent application Ser. No. 15/683,452, filed on Aug. 22, 2017, now abandoned, which in turn claims the benefit of U.S. provisional application 62/377,941 filed on Aug. 22, 2016, the contents of all of which are hereby incorporated by reference herein.

FIELD OF INVENTION

The application relates to wireless communication technologies. Specifically, the application relates to broadband communication systems.

SUMMARY

A consumer premise equipment (CPE) which may comprise a processor, a storage medium, and an antenna, wherein the processor may be operatively coupled to the storage medium and the antenna to receive, from multiple antennas of a hub station, a first beam training announcement signal that may inform the CPE to be ready to receive a beam training packet using one or more beams, wherein the beam training packet may include a plurality of symbols that are each beamformed using a different beamformer or precoder; and send, to the hub station, a beamforming feedback report based on measurements taken by the CPE, possibly as a result of the CPE receiving the first beam training announcement signal.

DETAILED DESCRIPTION

The advancement in wireless communication in the past several decades has been an important part of the information and communication technology revolution. The success of the Third Generation (3G) and the Fourth Generation (4G) cellular communication technologies, together with the success of Wi-Fi, has spurred explosive growth of wireless traffic. In the era of Fifth Generation (5G) wireless communication, it may be expected that mobile broadband access via smartphones and other portable devices is ubiquitous, and billions of devices may be connected—mostly wirelessly—to become part of the so-called Internet of Things (IoT). This trend may allow for wireless communication using Millimeter-wave, Massive Multiple-Input-Multiple-Output (MIMO), and/or small cells to provide connectivity and capacity for billions of people and machines in an era of 5G and beyond.

Figure 1A:
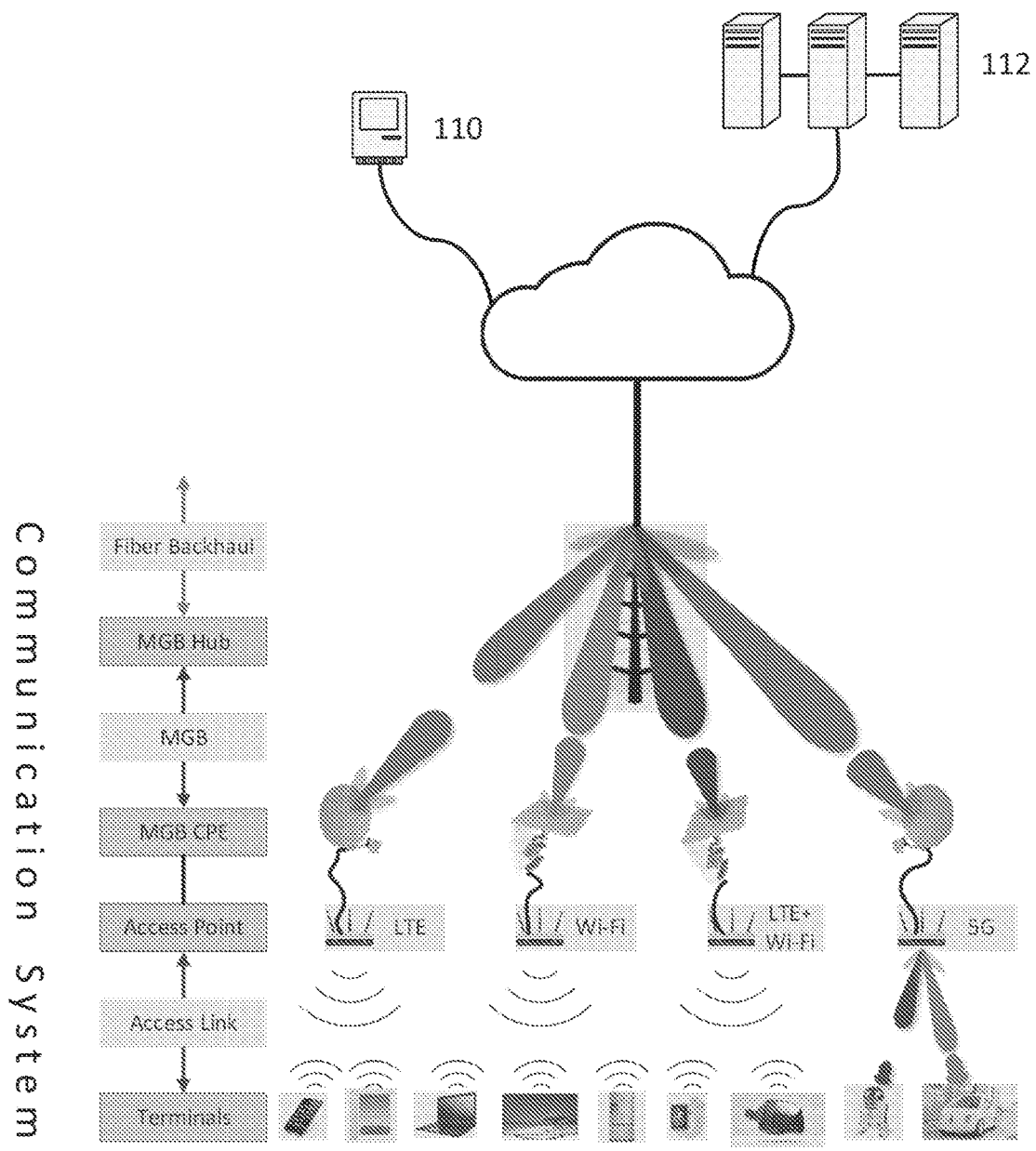
FIG. 1A shows an example of an MGB system that connects LTE, Wi-Fi, and 5G Access Points.
Figure 1B:
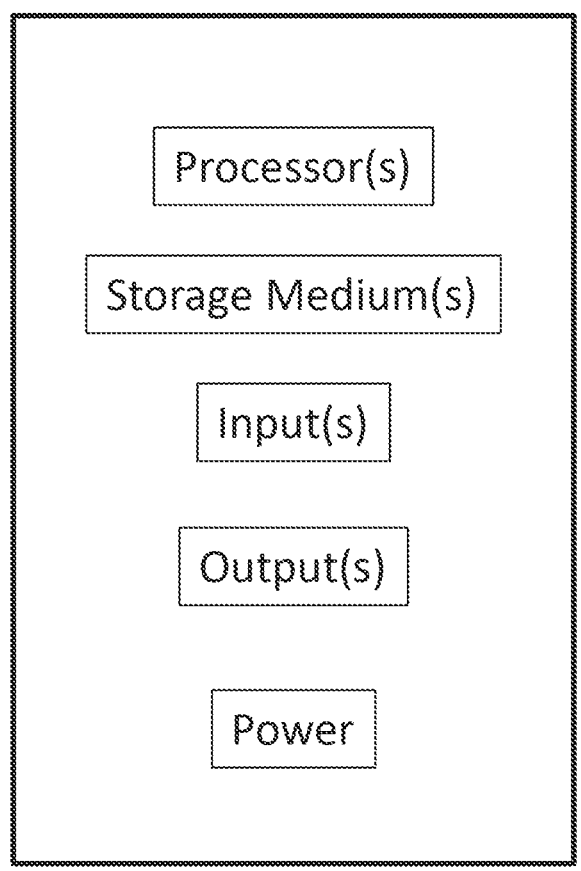
FIG. 1B shows an example of hardware comprising components typical in a piece of hardware.

In an example communication system of FIG. 1A, fixed millimeter-wave gigabit broadband (MGB) may be used and may comprise an MGB Hub and a number of Consumer Premise Equipment (CPE). An MGB CPE may be any device that facilitates communication between an MGB Hub (Hub) and an access point or terminal. An MGB Hub may be connected via fiber, or the like, to a network of connected computers, such as the Internet, which in turn may facilitate connection to service providers, computers 110, servers 112, and the like. A CPE may comprise, for example, see FIG. 1B, a processor, a storage medium, software stored on the storage medium and executed by the processor, one or more input ports or hardware such as a keyboard or one or more antennas, one or more output ports or hardware such as a display or one or more antennas. A CPE may also be known as a set top box, telephone, router, switch, residential gateway, fixed mobile convergence product, home networking adapter, and internet access gateway. A CPE may be an active device or a passive device. A CPE may be a hybrid device which may act as the source point for more than one type of service.

In the example communication system of FIG. 1A, communication between the MGB Hub and the MGB CPE may be established in millimeter wave spectrum. Both a transmitter and a receiver use a combination of analog beamforming and digital MIMO processing to adapt to the channel condition. A typical MGB Hub may have 1-6 sectors. Each sector uses a planar phased antenna array and dynamically form beams to transmit to and receive from small cells. The MOB CPE may use a high-gain antenna (e.g., a dish antenna) to point to a direction towards which communication to and from an MGB Hub may be established. Alternatively, the MGB CPE may also use planar phased antenna arrays to point to the best directions to transmit to and receive from the MGB Hub. In another alternative, the MGB CPE may use an Omni-directional antenna. Each MGB CPE may be connected to one or multiple wireless access points, such as small cell base stations, Wi-Fi access points, Wi-Fi routers, or the like that provide wireless access to one or more terminals/devices of a variety of usage scenarios, including wireless broadband access to residential homes or enterprise buildings and small cell backhaul for 4G or 5G mobile communication networks, etc. The access link may have small cells that use either LTE, or Wi-Fi, or 5G, or a combination of these access technologies. Alternatively, the access points, such as a router or a switch, may have a wired connection to one or more terminals/devices. The terminals/devices may include smart phones, tablets, laptops, TVs, home appliances, wearable devices, sensors, cameras, personal computers, servers, databases, smart devices, TVs, refrigerators, watches, virtual reality equipment, User Equipment (UE) and other connected devices such as home automation systems, robots, self-driving cars, drones, air craft, boats, or ships. These terminals/devices may in one embodiment comprise elements, for example, see FIG. 1B, such as comprise a processor, a storage medium, software stored on the storage and executed by the processor, one or more input ports or hardware such as a keyboard or mouse, one or more output ports or hardware such as a display or one or more antennas.

The example communication system of FIG. 1A may also include, but is not shown, network elements such as a radio access network (RAN), public switched telephone network (PSTN), the Internet, and the like. The communication system of FIG. 1A may also include, but is not shown, a base station, base transceiver stations (BTS), eNodeB, Node-B, base station controller (BSC), radio network controller (RNC), relay nodes, and the like. The communication system of FIG. 1A may employ one or more channel access methods such as, but not limited to, time division multiplexing, frequency division multiplexing, code division multiplexing, and the like.

One aspect of MGB may be beamforming. To enable beamforming, beam training packets (BTP) may be used for beam training purposes. The MGB Hub may begin the beam training process by transmitting a Beam Training Packet Announcement (BTPA). The BTPA may include the identification of the intended MGB CPE (or MGB CPEs). The BTPA may be followed by a BTP. The BTP contains beam training signals that enable the intended MGB CPE (or MGB CPEs) to estimate the channel and generate feedback to the MGB Hub. The MGB Hub may then use the feedback information regarding the channel to MGB CPEs in its scheduling and transmission decisions. Alternatively, one or more CPEs may communicate with more than one MGB Hubs simultaneously or in a timed fashion.

Described herein are methods and apparatuses for operating a system for efficiently transmitting and receiving beam training signals and data packets in a fixed millimeter-wave gigabit broadband (MGB) system. The fixed millimeter-wave gigabit broadband system includes an MGB Hub and multiple pieces of MGB Consumer Premise Equipment (CPEs). The MGB Hub may employ a phased array antenna with the ability to dynamically create one or multiple beams pointing to different spatial directions. Each MGB CPE may use a fixed directional antenna to point to a direction that it may establish good communication with the MGB Hub. In various embodiments of the invention, the MGB Hub may transmit multiple beam training signals or data packets to multiple MGB CPEs simultaneously. The MGB CPEs transmit multiple beam training feedback or data packet acknowledgment to the MGB Hub simultaneously. The MGB Hub may also swap the antenna arrays used to transmit to different MGB CPEs to improve diversity for these transmissions while maintaining the beams to achieve spatial separation for these multiple transmissions.

Figure 2:
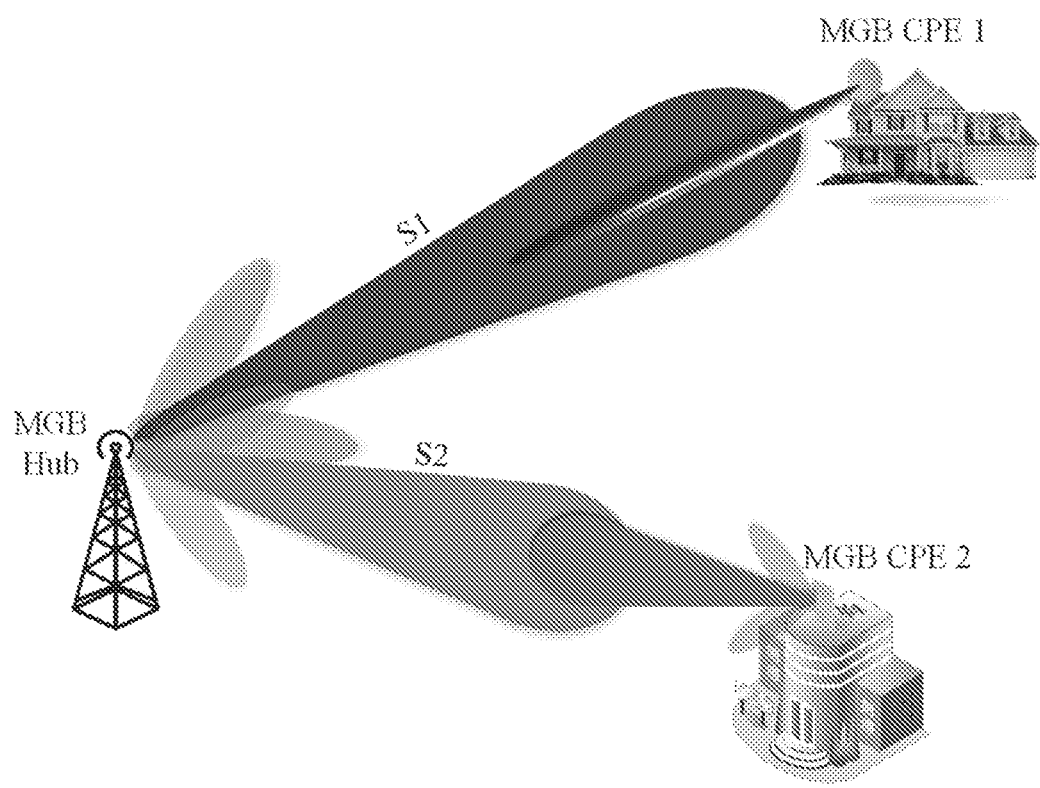
FIG. 2 shows an example of a multi-stream beamforming training, feedback, and data communication.
Figure 3:
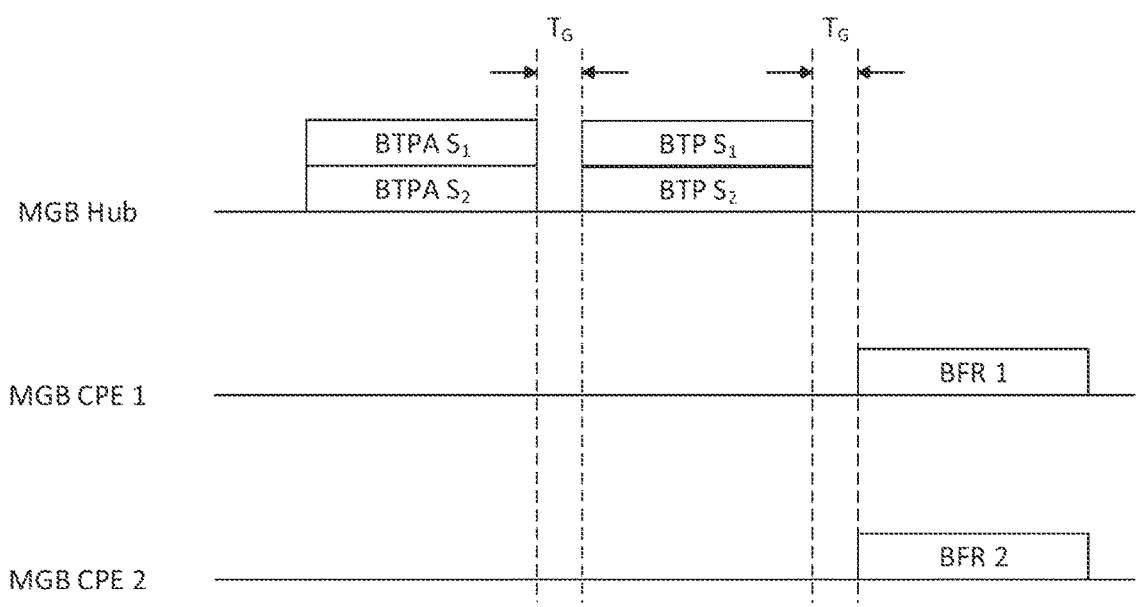
FIG. 3 shows an example of a BTP Announcement with Long-term Beamforming.

In one embodiment of the invention, an MGB hub station may transmit a first beam training announcement packet using a first beam or set of beams. A beam may be defined as a certain way of using multiple antennas to transmit a signal. For example, the same beam training signal may be transmitted via multiple antennas with a different phase applied to each antenna, resulting in higher radiated power along certain spatial directions while lower radiated power along others. This technique may be commonly referred to as beamforming. Simultaneously, the said hub station may transmit a second beam training announcement using a second beam or set of beams. The beam training announcement notifies the intended consumer premise equipment (CPEs) to be ready to receive the beam training signals that follow the beam training announcement. For example, as shown in FIG. 3, the MGB Hub transmits a first Beam Training Packet Announcement (shown as "BTPA $S_1$" in FIG. 3) to signal the upcoming beam-training packet for a first beam or set of beams (denoted as "$S_1$" in FIG. 3) using a first Beam Training Packet (BTP). Simultaneously, the MGB Hub may also transmit a second BTPA (shown as "BTPA $S_2$" in FIG. 3) to signal the upcoming beam-training packet for a second beam or set of beams (denoted as "$S_2$" in FIG. 2) using a second BTP. The BTPA packet may indicate which CPE should be prepared to receive the upcoming BTP. For example, the first BTPA indicates MGB CPE 1 as the intended recipient of the upcoming training signal in the first BTP; the second BTPA indicates MGB CPE 2 as the intended recipient of the upcoming training signal in the second BTP.

In another embodiment of the invention, an MGB Hub station may transmit a first beam-training packet (BTP) using a first beam or set of beams. At the same time, the said hub station transmits a second beam-training packet using a second beam or set of beams. Within the BTP for $S_1$, there may be multiple training symbols, each may be beamformed using a different beamformer/precoder in beam or beam set $S_1$. Similarly, within the BTP for $S_2$, there may be multiple training symbols, each may be beamformed using a different beamformer/precoder in beam or beam set $S_2$.

Figure 4:
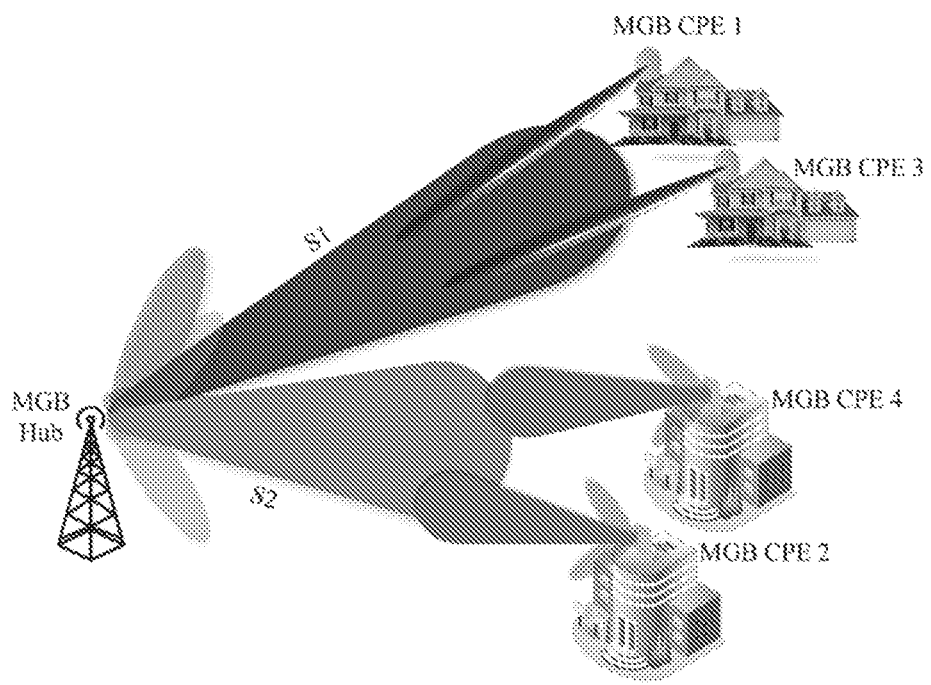
FIG. 4 shows an example of a multi-stream beamforming training, feedback, and data communication with multiple CPEs.
Figure 5:
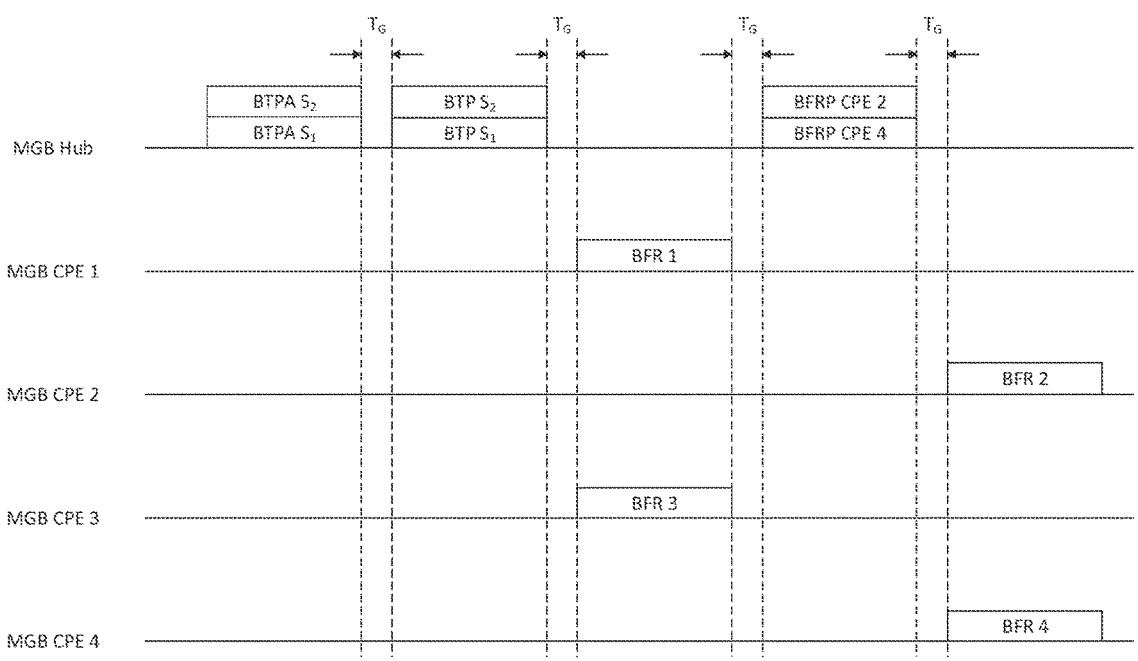
FIG. 5 shows an example of a channel sounding with multiple beamforming training signals.

The beam training efficiency may be further increased by training multiple CPEs at the same time within the same set of beams. For example, see FIG. 4 and FIG. 5. A training signal announcement for a first set of beams (denoted as "BTPA $S_1$" in FIG. 5) may notify both MGB CPE 1 and MGB CPE 3 to be ready for the upcoming beam training signal BTP $S_1$. Simultaneously, the training signal announcement for the second set of beams (denoted as "BTPA $S_2$" in FIG. 5) may notify both MGB CPE 2 and MGB CPE 4 to be ready for the upcoming beam training signal BTP $S_2$. MGB CPE 1 and MGB CPE 3 may measure the channel condition upon receiving BTP $S_1$. MGB CPE 2 and MGB CPE 4 may measure the channel condition upon receiving BTP $S_2$. Then, MGB CPE 1 sends the Beamforming Feedback Report (shown as "BFR 1" in FIG. 5) to the MGB Hub, possibly after a brief time gap to allow processing and to account for propagation delay (shown as "$T_G$" in FIG. 5). Simultaneously, MGB CPE 2 may send the BFR 2 to the MGB Hub. The MGB Hub may further send Beamforming Feedback Report Poll to MGB CPE 2 (shown as "BFRP CPE 2" in FIG. 5) to request beamforming report from MGB CPE 2. Simultaneously, the MGB Hub may send BFRP to MGB CPE 4 (shown as "BFRP CPE 4" in FIG. 5) to request beamforming report from MGB CPE 4. Upon receiving the BFRPs, MGB CPE 2 and MGB CPE 4 may simultaneously transmit the BFRs to the MGB Hub in the same time slot. In this way, the beam training overhead may be greatly reduced due to the system's ability to conduct beam training for multiple sets of beams at the same time.

In one embodiment of the invention, a first set of beams $S_1$ may include a first beam formed by applying a first set of amplitude and phase shift values to a first set of antennas, and a second beam formed by applying a second set of amplitude and phase shift values to a second set of antennas. Preferably, the first set of amplitude and phase shift values should be the same or similar as the second set of amplitude and phase shift values so that the beams in the same set of beams point to the same spatial direction. The first set of antennas and the second set of antennas may have different polarization. For example, the first set of antennas may be vertically polarized while the second set of antennas may be horizontally polarized. Alternatively, the first set of antennas may be +45° polarized while the second set of antennas may be −45° polarized. Alternatively, the first set of antennas may be right-handed circular polarized while the second set of antennas may be left-handed circular polarized. The first set of antennas with a first polarization and the second set of antennas with a second polarization may also be created by feeding the same set of physical antennas with two different sets of feed points that results in radiation with two different polarizations. This may allow communication with 2 MIMO streams via the first beam and the second beam. Since the first beam and the second beam may be transmitted using antenna elements with different polarization, it may be possible for the receiver to receive these two beams with limited interference between these two beams and achieve good performance for the 2 MIMO streams.

Figure 6:
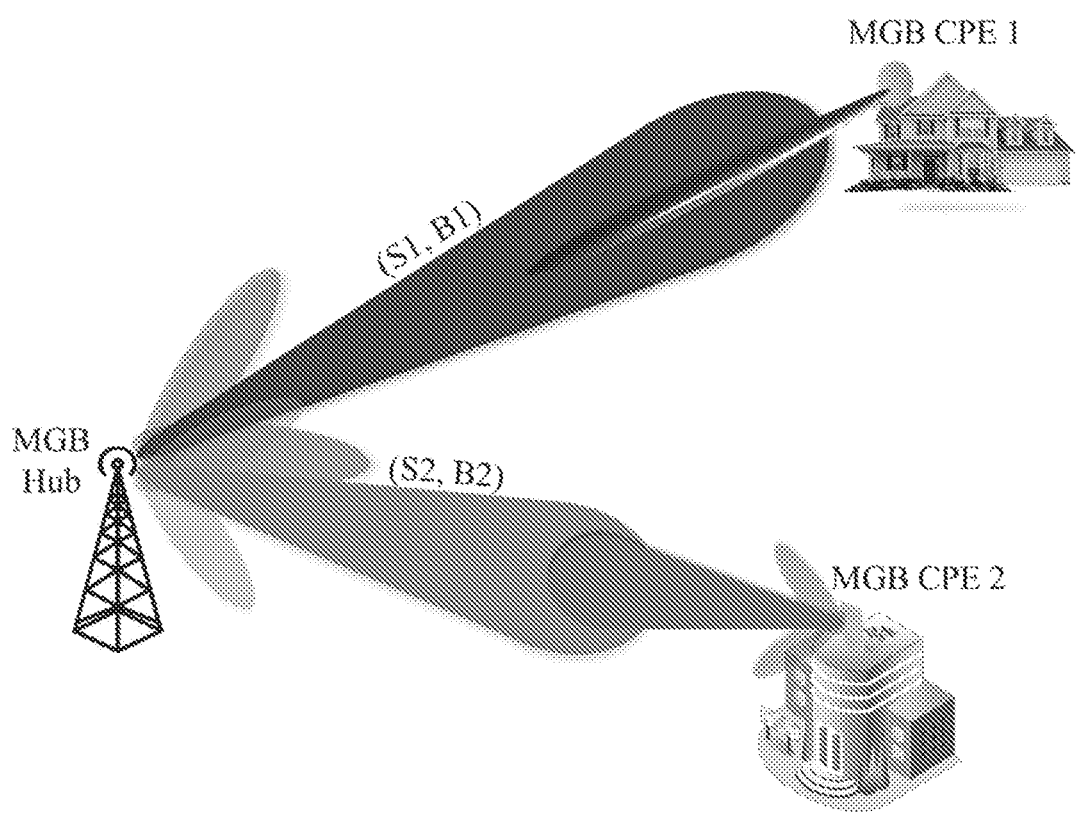
FIG. 6 shows an example of a multi-user MIMO with long-term beamforming.

In another embodiment of the invention, an MGB Hub station may transmit a first data packet using a first beam within the first set of beams. Simultaneously, the said hub station may transmit a second data packet using a second beam within the second set of beams. An example is shown in FIG. 6, where the MGB Hub transmits a first data packet using beam ($S_1$, $B_1$) to MGB CPE 1. Simultaneously, the MGB Hub may transmit a second data packet using beam ($S_2$, $B_2$) to MGB CPE 2. The beams in beam set $S_1$ may point to the spatial direction of MGB CPE 1. The beams in beam set $S_2$ may point to the spatial direction of MGB CPE 2. Beam ($S_1$, $B_1$) may be vertically polarized. Beam ($S_2$, $B_2$) may be horizontally polarized. The simultaneous transmission of the first data packet using beam ($S_1$, $B_1$) and the second data packet using beam ($S_2$, $B_2$) may achieve good separation of these two beams (and the two packets) using spatial separation and different polarization, which may result in good multi-user MIMO performance.

Figure 7:
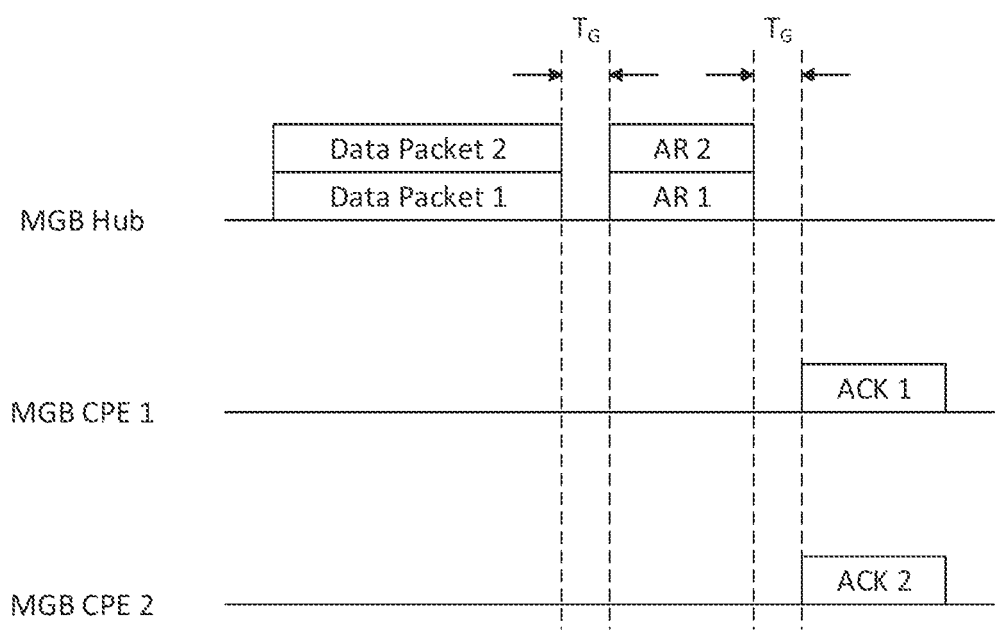
FIG. 7 shows an example of an MU-MIMO with multi-user ACK requests and acknowledgments via beamforming.

In another embodiment of the invention, the MGB Hub may simultaneously send a first acknowledgment request (shown as "AR 1" in FIG. 7) to MGB CPE 1 and a second acknowledgment request (shown as "AR 2" in FIG. 7) to MGB CPE 2. Upon receiving the acknowledgment requests, MGB CPE 1 may transmit a first acknowledgment (shown as "ACK 1" in FIG. 7) while simultaneously MGB CPE 2 may transmit a second acknowledgment (shown as "ACK 2" in FIG. 7). This scheme may allow simultaneous transmission of multiple acknowledgment requests, and simultaneous transmission of multiple acknowledgments, which may significantly reduce the acknowledgment signaling overhead for multi-user MIMO transmission and increasing system throughput.

Figure 8:
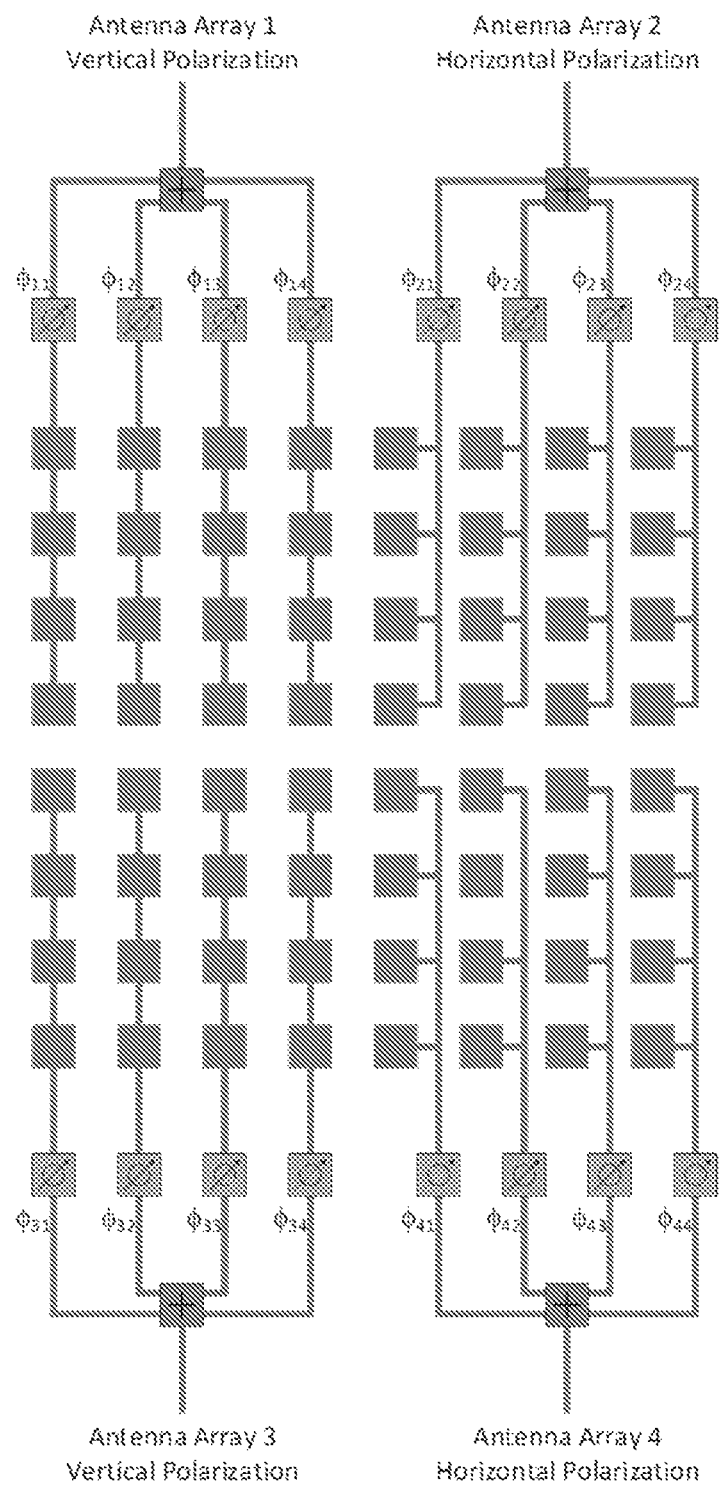
FIG. 8 shows an example of Antenna Array Hopping.

FIG. 8 shows an example of MGB Hub antenna with multiple arrays. In this example, the MGB Hub may have 4 transmit arrays. Antenna Array 1 and Antenna Array 3 may be vertically polarized. Antenna Array 2 and Antenna Array 4 may be horizontally polarized. Each antenna array may have 4 columns of patch antenna elements. All elements in each column may be fed by a single input port. Each column may be connected to a phase shifter so that the phase of the input signal to an antenna array may be changed at each column to result in different beam patterns in space.

In one embodiment of the invention, the MGB Hub may alternate the mapping from beam training symbols to antenna arrays to achieve efficient use of time frequency resources for beam training. For example, assuming the MGB Hub transmits beam training packet BTP $S_1$ to MGB CPE 1 and simultaneously beam training packet BTP $S_2$ to MGB CPE2. There may be multiple training symbols in each packet. In the first symbol time $t_1$, the MGB Hub may transmit a first beamforming training symbol $x_1(t_1)$ using a first beamforming vector $\vec{\phi}_1 = [\phi_{11}, \phi_{12}, \phi_{13}, \phi_{14}]$ via Antenna Array 1. Simultaneously, the MGB Hub may transmit a second beamforming training symbol $x_2(t_1)$ using a second beamforming vector $\vec{\phi}_2 = [\phi_{21}, \phi_{22}, \phi_{23}, \phi_{24}]$ via Antenna Array 2. Antenna Array 1 and Antenna Array 2 may have different polarization while beamforming vectors $\vec{\phi}_1$ and $\vec{\phi}_2$ point to different spatial direction. In the second symbol time $t_2$, the MGB Hub may transmit a third beamforming training symbol $x_1(t_2)$ using the said first beamforming vector $\vec{\phi}_1$ (or a beamforming vector that may be isomorphic to $\vec{\phi}_1$) via Antenna Array 2. Simultaneously, the MGB Hub may transmit a fourth beamforming training symbol $x_2(t_2)$ using the said second beamforming vector $\vec{\phi}_2$ (or a beamforming vector that may be isomorphic to $\vec{\phi}_2$) via Antenna Array 1. In other words, the beamforming vectors applied to Antenna Array 1 and Antenna Array 2 may be swapped in symbol time $t_2$ vs. symbol time $t_1$. This scheme may allow beamforming training for MGB CPE 1 and MGB CPE 2 at the same time with minimal interference, achieving efficient use of time and frequency resources.

In another embodiment of the invention, the MGB Hub may alternate the mapping from data symbols to antenna arrays to achieve efficient use of time frequency resources for data transmission. For example, it may be assumed that the MGB Hub transmits a first data packet to MGB CPE 1 and simultaneously a second data packet to MGB CPE2. There may be multiple data symbols in each packet. In the first symbol time $t_1$, the MGB Hub may transmit a first data symbol $d_1(t_1)$ using a first beamforming vector $\vec{\phi}_1 = [\phi_{11}, \phi_{12}, \phi_{13}, \phi_{14}]$ via Antenna Array 1. Simultaneously, the MGB Hub may transmit a second data symbol $d_2(t_1)$ using a second beamforming vector $\vec{\phi}_2 = [\phi_{21}, \phi_{22}, \phi_{23}, \phi_{24}]$ via Antenna Array 2. Antenna Array 1 and Antenna Array 2 have different polarization while beamforming vectors $\vec{\phi}_1$ and $\vec{\phi}_2$ point to different spatial directions. In the second symbol time $t_2$, the MGB Hub may transmit a third data symbol $d_1(t_2)$ using the said first beamforming vector $\vec{\phi}_1$ (or a beamforming vector that may be isomorphic to $\vec{\phi}_1$) via Antenna Array 2. Simultaneously, the MGB Hub may transmit a fourth data symbol $d_2(t_2)$ using the said second beamforming vector $\vec{\phi}_2$ (or a beamforming vector that may be isomorphic to $\vec{\phi}_2$) via Antenna Array 1. In other words, the beamforming vectors may be applied to Antenna Array 1 and Antenna Array 2 may be swapped in symbol time $t_2$ vs symbol time $t_1$. In this way, some data symbols of the first data packet may be transmitted via Antenna Array 1 using a first polarization scheme while other data symbols of the first data packet may be transmitted via Antenna Array 2 using a second polarization scheme. Similarly, some data symbols of the second data packet may be transmitted via Antenna Array 2 using the said second polarization scheme while other data symbols of the second data packet may be transmitted via Antenna Array 1 using the said first polarization scheme. This approach may allow data transmission to MGB CPE 1 and MGB CPE 2 at the same time with minimal interference while increasing diversity for both data packets.

This transmission method may be extended to transmissions with more than 2 MIMO streams. For example, assume an MGB Hub transmits 2 MIMO streams to MGB CPE 1 and another 2 MIMO streams to MGB CPE 2. In the first symbol time $t_1$, the MGB Hub may transmit a first data symbol $d_1(t_1)$ using a first beamforming vector $\vec{\phi}_1=[\phi_{11}, \phi_{12}, \phi_{13}, \phi_{14}]$ via Antenna Array 1 and a second data symbol $d_2(t_1)$ using the said first beamforming vector $\vec{\phi}_1$ (or a beamforming vector that may be isomorphic to $\vec{\phi}_1$) via Antenna Array 2. Simultaneously, the MGB Hub may transmit a third data symbol $d_3(t_1)$ using a second beamforming vector $\vec{\phi}_2=[\phi_{21}, \phi_{22}, \phi_{23}, \phi_{24}]$ via Antenna Array 3 and a fourth data symbol $d_4(t_1)$ using the said second beamforming vector $\vec{\phi}_2$ (or a beamforming vector that may be isomorphic to $\vec{\phi}_2$) via Antenna Array 4. Antenna Array 1 and Antenna Array 2 may have different polarization while beamforming vectors $\vec{\phi}_1$ and $\vec{\phi}_2$ may achieve good spatial separation. In the second symbol time $t_2$, the MGB Hub may transmit a fifth data symbol $d_1(t_2)$ using the said first beamforming vector $\vec{\phi}_1$ (or a beamforming vector that may be isomorphic to $\vec{\phi}_1$) via Antenna Array 3 and a sixth data symbol $d_2(t_2)$ using the said first beamforming vector $\vec{\phi}_1$ (or a beamforming vector that may be isomorphic to $\vec{\phi}_1$) via Antenna Array 4. Simultaneously, the MGB Hub may transmit a seventh data symbol $d_3(t_2)$ using the said second beamforming vector $\vec{\phi}_2$ (or a beamforming vector that may be isomorphic to $\vec{\phi}_2$) via Antenna Array 1 and an eighth data symbol $d_3(t_2)$ using the said second beamforming vector $\vec{\phi}_2$ (or a beamforming vector that may be isomorphic to $\vec{\phi}_2$) via Antenna Array 2. This scheme may allow data transmissions to MGB CPE 1 and MGB CPE 2 at the same time with minimal interference while achieving diversity for transmissions to both MGB CPE 1 and MGB CPE 2.

In another embodiment of the invention, the MGB Hub may alternate the mapping from data symbols to antenna arrays to achieve efficient use of time frequency resources for data reception. For example, it may be assumed that an MGB Hub receives a first data packet from MGB CPE 1 and simultaneously a second data packet from MGB CPE2. There may be multiple data symbols in each packet. In the first symbol time $t_1$, the MGB Hub may receive a first data symbol $d_1(t_1)$ using a first beamforming vector $\vec{\phi}_1=[\phi_{11}, \phi_{12}, \phi_{13}, \phi_{14}]$ via Antenna Array 1. Simultaneously, the MGB Hub may receive a second data symbol $d_2(t_1)$ using a second beamforming vector $\vec{\phi}_2=[\phi_{21}, \phi_{22}, \phi_{23}, \phi_{24}]$ via Antenna Array 2. Antenna Array 1 and Antenna Array 2 may have different polarization while beamforming vectors $\vec{\phi}_1$ and $\vec{\phi}_2$ point to different spatial directions. In the second symbol time $t_2$, the MGB Hub may receive a third data symbol $d_1(t_2)$ using the said first beamforming vector $\vec{\phi}_1$ (or a beamforming vector that may be isomorphic to $\vec{\phi}_1$) via Antenna Array 2. Simultaneously, the MGB Hub may receive a fourth data symbol $d_2(t_2)$ using the said second beamforming vector $\vec{\phi}_2$ (or a beamforming vector that may be isomorphic to $\vec{\phi}_2$) via Antenna Array 1. In other words, the beamforming vectors applied to Antenna Array 1 and Antenna Array 2 may be swapped in symbol time $t_2$ vs symbol time $t_1$. In this way, some data symbols of the first data packet may be received via Antenna Array 1 using a first polarization scheme while other data symbols of the first data packet may be received via Antenna Array 2 using a second polarization scheme. Similarly, some data symbols of the second data packet may be received via Antenna Array 2 using the said second polarization scheme while other data symbols of the second data packet may be received via Antenna Array 1 using the said first polarization scheme. This approach may allow data transmission by MGB CPE 1 and MGB CPE 2 at the same time with minimal interference while increasing diversity for both data packets.

This reception method may extend to reception with more than 2 MIMO streams. For example, assume an MGB Hub receives 2 MIMO streams from MGB CPE 1 and another 2 MIMO streams from MGB CPE 2. In the first symbol time $t_1$, the MGB Hub may receive a first data symbol $d_1(t_1)$ using a first beamforming vector $\vec{\phi}_1=[\phi_{11}, \phi_{12}, \phi_{13}, \phi_{14}]$ via Antenna Array 1 and a second data symbol $d_2(t_1)$ using the said first beamforming vector $\vec{\phi}_1$ (or a beamforming vector that may be isomorphic to $\vec{\phi}_1$) via Antenna Array 2. Simultaneously, the MGB Hub may receive a third data symbol $d_3(t_1)$ using a second beamforming vector $\vec{\phi}_2=[\phi_{21}, \phi_{22}, \phi_{23}, \phi_{24}]$ via Antenna Array 3 and a fourth data symbol $d_4(t_1)$ using the said second beamforming vector $\vec{\phi}_2$ (or a beamforming vector that may be isomorphic to $\vec{\phi}_2$) via Antenna Array 4. Antenna Array 1 and Antenna Array 2 may have different polarization while beamforming vectors $\vec{\phi}_1$ and $\vec{\phi}_2$ achieve good spatial separation. In the second symbol time $t_2$, the MGB Hub receives a fifth data symbol $d_1(t_2)$ using the said first beamforming vector $\vec{\phi}_1$ (or a beamforming vector that may be isomorphic to $\vec{\phi}_1$) via Antenna Array 3 and a sixth data symbol $d_2(t_2)$ using the said first beamforming vector $\vec{\phi}_1$ (or a beamforming vector that may be isomorphic to $\vec{\phi}_1$) via Antenna Array 4. Simultaneously, the MGB Hub may receive a seventh data symbol $d_3(t_2)$ using the said second beamforming vector $\vec{\phi}_2$ (or a beamforming vector that may be isomorphic to $\vec{\phi}_2$) via Antenna Array 1 and an eighth data symbol $d_3(t_2)$ using the said second beamforming vector $\vec{\phi}_2$ (or a beamforming vector that may be isomorphic to $\vec{\phi}_2$) via Antenna Array 2. This scheme may allow data transmissions by MGB CPE 1 and MGB CPE 2 at the same time with minimal interference while achieving diversity for transmissions from both MGB CPE 1 and MGB CPE 2.

Figure 9:
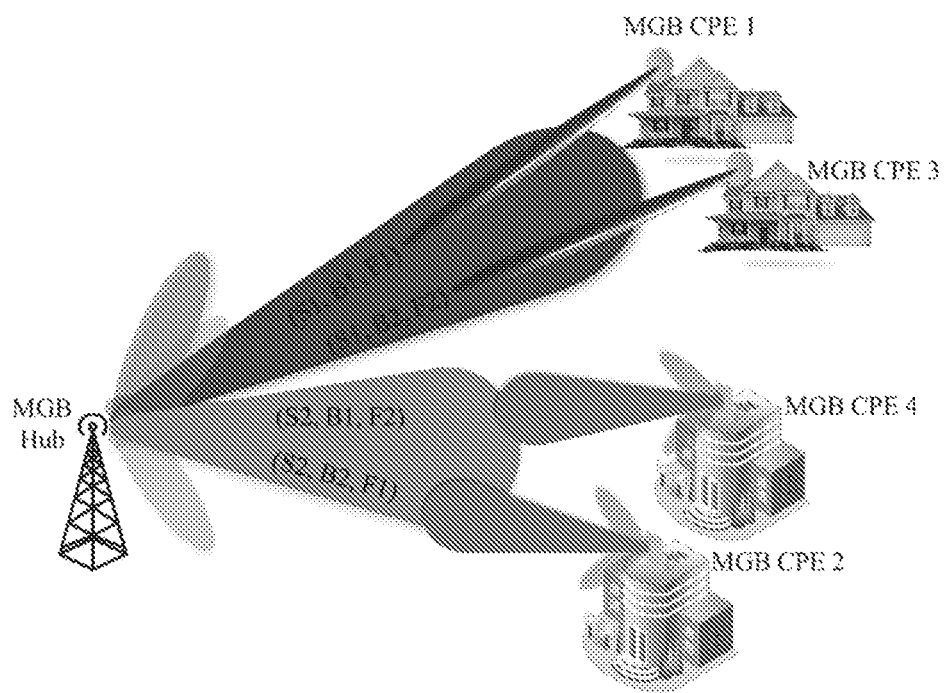
FIG. 9 shows an example of multi-stream beamforming training, feedback, and data communication with multiple CPEs and multiple carriers.

The separation of the multiple streams in an MU-MIMO transmission may be further enhanced by frequency separation. One example may be shown in FIG. 9. The transmissions from the MGB Hub to MGB CPE 1 and MGB CPE 3 may use beamforming vectors from beam set S1, i.e., they may have similar or largely overlapping spatial signature. To increase the separation, beamforming vector (S1, B1) may be used for transmission to MGB CPE 1 while beamforming vector (S1, B2) may be used for transmission to MGB CPE 3. For example, (S1, B1) may be vertically polarized while (S1, B2) may be horizontally polarized to achieve good spatial separation between the transmission to MGB CPE 1 and the transmission to MGB CPE 3. In addition, carrier F1 may be used for transmission to MGB CPE 1 while carrier F2 may be used for transmission to MGB CPE 3. The transmission to MGB CPE 1 and the transmission to MGB CPE 3 may be thus further separated by frequency. Similarly, the MGB Hub may transmit to MGB CPE 2 using beamforming vector (S2, B2) on carrier F1 while transmitting to MGB CPE 4 using beamforming vector (S2, B1) on carrier F2.

All aspects of the present disclosure are described as example embodiments and not intended to otherwise limit the aspects that one of ordinary skill in the art would appreciate could be used alone or in combination with any of the aspects described above. In some examples and/or embodiments described herein reference is made to a singular instance of an element, or reference is made to a plurality of an element, however, all elements discussed herein may be singular or plural and should not be limited by their example embodiments and/or examples. Additionally, the methods described herein may be carried out by a program, software, or firmware stored on a non-transitory computer-readable medium executed by a computer/processor connected to an antenna for sending and receiving signals. A storage medium may comprise, but is not limited to, one or more of read only memory (ROM), random access memory (RAM), registers, cache memory, semiconductor memory devices, solid state drives, USB drives, magnetic media such as internal hard disks and removable disks, magneto-optical media, and optical media such as CD-ROM disks, Mini-Discs, Blu-Ray Discs, digital versatile disks (DVDs), and the like. The program, software, or firmware may be carried out in any type of computing device such as, but not limited to, a CPE, Hub, UE, smartphone, terminal, base station, relay station, RNC, host computer, server, database, laptop, tablet, or any hardware described herein or its known equivalent.

What is claimed is:

1. A method comprising:
    transmitting a first beam training announcement packet using a first beam, the first beam having a first polarization and formed in a first direction toward a first consumer premise equipment (CPE);
    transmitting a second beam training announcement packet using a second beam, the second beam having a second polarization and formed in a second direction toward a second CPE;
    wherein the first beam training announcement packet is sent during a first time slot by a first set of antennas, and the second beam training announcement packet is sent during the first time slot by a second set of antennas;
    wherein the first direction and the second direction are not the same; and
    wherein the first polarization and the second polarization are not the same.
2. The method of claim 1, wherein the first polarization is vertical polarization.
3. The method of claim 1, wherein the first polarization is right-handed circular polarization.
4. The method of claim 1, further comprising:
    subsequent to transmitting the first beam training announcement packet, transmitting a first beam training packet using the first beam; and
    subsequent to transmitting the second beam training announcement packet, transmitting a second beam training packet using the second beam.
5. The method of claim 4, wherein transmitting the first beam training packet and transmitting the second beam training packet occur during a second time slot.
6. The method of claim 4, wherein the first beam training packet includes multiple training symbols.
7. The method of claim 4, wherein the first beam training announcement packet includes an indication that the first CPE should be prepared to receive the first beam training packet, and the second beam training announcement packet includes an indication that the second CPE should be prepared to receive the second beam training packet.
8. The method of claim 7, further comprising:
    wherein the first beam training announcement packet includes an indication that a third CPE should be prepared to receive the first beam training packet, and the second beam training announcement packet includes an indication that a fourth CPE should be prepared to receive the second beam training packet.
9. The method of claim 1, further comprising:
    receiving a first beamforming feedback report from the first CPE; and
    receiving a second beamforming feedback report from the second CPE.
10. The method of claim 9, wherein the receiving of the first beamforming feedback report occurs during a third time slot, and the receiving of the second beamforming feedback report occurs during the third time slot.
11. A system comprising:
    a transmitter comprising a first plurality of antennas and a second plurality of antennas different than the first plurality of antennas, the transmitter configured to
        transmit a first beam training announcement packet using a first beam formed using the first plurality of antennas, the first beam having a first polarization and formed in a first direction toward a first consumer premise equipment (CPE), and
        transmit a second beam training announcement packet using a second beam formed using the second plurality of antennas, the second beam having a second polarization and formed in a second direction toward a second CPE;
    wherein the first beam training announcement packet is sent during a first time slot, and the second beam training announcement packet is sent during the first time slot;
    wherein the first direction and the second direction are not the same; and
    wherein the first polarization and the second polarization are not the same.
12. The system of claim 11, wherein the first polarization is vertical polarization.
13. The system of claim 11, wherein the first polarization is right-handed circular polarization.
14. The system of claim 11, wherein the transmitter is further configured to:
    subsequent to transmitting the first beam training announcement packet, transmit a first beam training packet using the first beam; and
    subsequent to transmitting the second beam training announcement packet, transmit a second beam training packet using the second beam.
15. The system of claim 14, wherein the transmitter is configured to transmit the first beam training packet during a second time slot and transmit the second beam training packet during the second time slot.
16. The system of claim 14, wherein the first beam training packet includes multiple training symbols.
17. The system of claim 14, wherein the first beam training announcement packet includes an indication that the first CPE should be prepared to receive the first beam training packet, and the second beam training announcement packet includes an indication that the second CPE should be prepared to receive the second beam training packet.

18. The system of claim 17, wherein the first beam training announcement packet includes an indication that a third CPE should be prepared to receive the first beam training packet, and the second beam training announcement packet includes an indication that a fourth CPE should be prepared to receive the second beam training packet.

19. The system of claim 11, further comprising:
a receiver comprising a third plurality of antennas and a fourth plurality of antennas different than the third plurality of antennas, the receiver configured to
receive a first beamforming feedback report from the first CPE, and
receive a second beamforming feedback report from the second CPE.

20. The system of claim 19, wherein the receiver is configured to receive the first beamforming feedback report during a third time slot and receive the second beamforming feedback report during the third time slot.

\* \* \* \* \*